US007654423B1

(12) United States Patent
Christiansen

(10) Patent No.: US 7,654,423 B1
(45) Date of Patent: Feb. 2, 2010

(54) MOTOR VEHICLE ROOF STANDOFF

(76) Inventor: Warren J. Christiansen, 1845 Anaheim #20B, Costa Mesa, CA (US) 92627

( * ) Notice: Subject to any disclaimer, the term of this patent is extended or adjusted under 35 U.S.C. 154(b) by 637 days.

(21) Appl. No.: 10/968,648

(22) Filed: Oct. 19, 2004

(51) Int. Cl.
B60R 9/00 (2006.01)
B60R 19/42 (2006.01)

(52) U.S. Cl. .................. 224/321; 224/562; 293/128
(58) Field of Classification Search ............ 224/321, 224/562; 293/128
See application file for complete search history.

(56) References Cited

U.S. PATENT DOCUMENTS

| 2,844,291 | A | * | 7/1958 | McPheeters | ............ 224/317 |
| 3,147,176 | A | * | 9/1964 | Haslam | ............ 428/55 |
| 4,294,478 | A | | 10/1981 | Marquette | |
| 4,690,446 | A | | 9/1987 | Warren | |
| 4,832,396 | A | | 5/1989 | Moreno et al. | |
| 4,940,009 | A | | 7/1990 | Keithley | |
| 4,957,400 | A | * | 9/1990 | Karp | ............ 410/110 |
| 5,267,763 | A | * | 12/1993 | Klein | ............ 293/128 |
| 5,529,371 | A | | 6/1996 | Egigian | |
| 6,315,327 | B1 | * | 11/2001 | Woolsey | ............ 280/770 |
| 6,692,047 | B1 | | 2/2004 | Solon | |

FOREIGN PATENT DOCUMENTS

DE 29719712 U1 * 1/1998
EP 0719676 A1 * 3/1996

* cited by examiner

Primary Examiner—Nathan J Newhouse
Assistant Examiner—Lester L Vanterpool
(74) Attorney, Agent, or Firm—Kenneth L. Green; Edgar W. Averill, Jr.

(57) ABSTRACT

A motor vehicle roof protection system includes a pair of magnetically attachable elongated roof standoffs to carry cargo above a car (or any motor vehicle) roof. One elongated roof standoffs may be positioned near a forward end of the car roof and another elongated roof standoffs may be positioned near a rearward end of the car roof. Magnets are embodied within the elongated roof standoffs to resist movement on the roof surface, with a layer of material under the magnets to protect the roof finish. The elongated roof standoffs have sloped tops, and the roof standoffs are positioned with the slopes facing forward to produce downward force on the roof standoffs, and thereby secure the roof standoffs with fewer magnets than otherwise required. The tops include a textured portion for contact with cargo. The cargo may be held against the elongated roof standoffs using straps, ropes, or any suitable fastener.

20 Claims, 3 Drawing Sheets

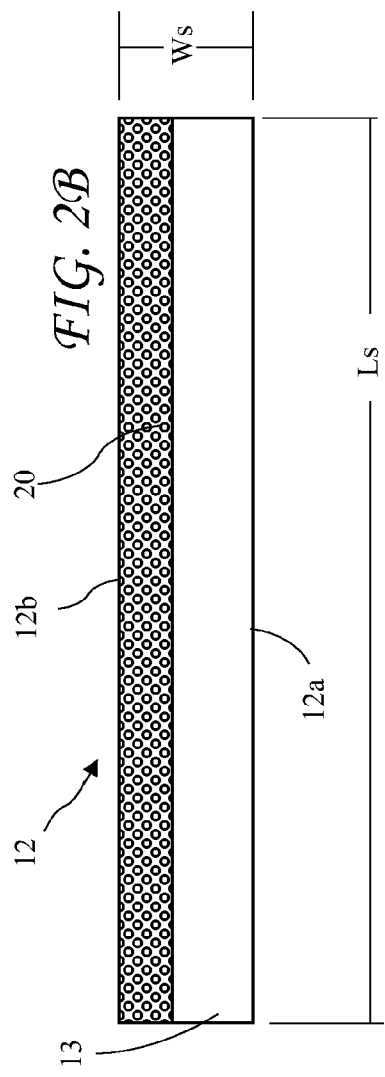
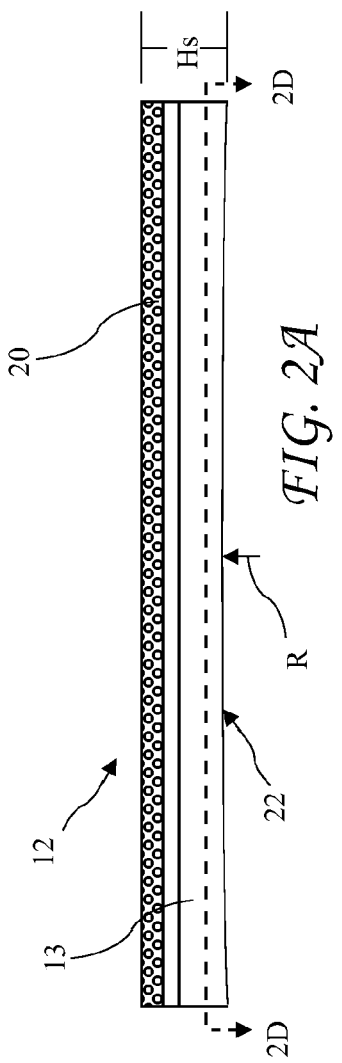
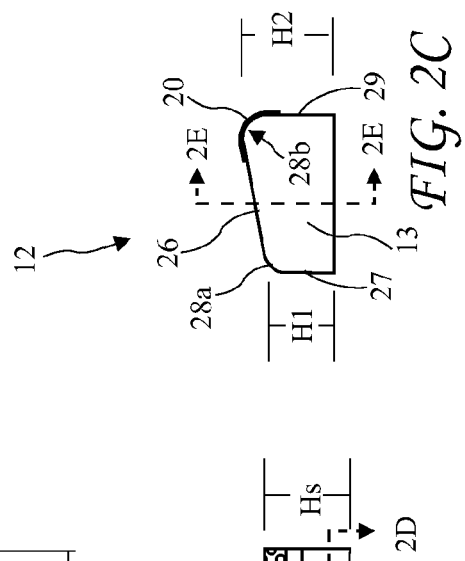
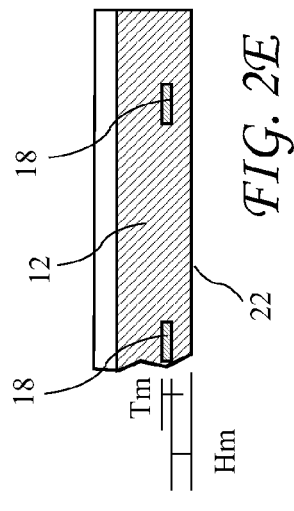
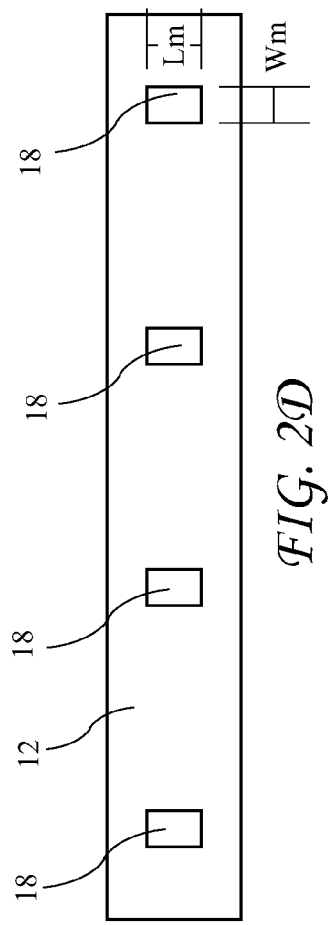

MOTOR VEHICLE ROOF STANDOFF

BACKGROUND OF THE INVENTION

The present invention relates to standoffs for supporting cargo on a motor vehicle roof, and in particular to a roof standoffs system including two elongated lateral roof standoffs.

Although the primary purpose of most automobiles is personal transportation, there is also a frequent need to transport other items such as sporting equipment, luggage, or building materials. Often, these items are too large to fit within the automobile interior or within a trunk, or the items are likely to damage the interior if carried therein. Roof racks have been developed to enable carrying such items on the roof of a motor vehicle.

Unfortunately, roof racks are either permanent, or are so difficult to install and remove, that they are effectively permanent. Known removable roof racks often require manipulation of cumbersome hooks and latches, and as a result, users inevitably either leave the racks in place on the automobile roof long after they are needed, or are reluctant to install the rack at all.

When permanent roof racks are installed on motor vehicle roofs, the air flow around the racks both creates drag and wind noise. With increasing fuel costs, drivers are reluctant to add mileage reducing drag to their automobiles. Further, drivers of high end automobiles are accustom to a quiet driving experience, and find excessive wind noise to be unacceptable A protective cover for truck roofs is described in U.S. Pat. No. 6,315,327 for "Protective Cover for Vehicle Surface." The cover of the '327 patent is a thin sheet-like article which preferably wraps around the rear edge of a truck roof, thereby allowing cargo, for example a ladder extended diagonally from the truck bed and over the cab, to be supported by the truck roof without damaging the truck roof. Unfortunately, the roof protector of the '327 patent relies at least partially on the roof edge to maintain position (and is thus limited in positioning), and does not provide adequate vertical stand-off to protect an arced roof if cargo is carried horizontally on the roof of a motor vehicle versus diagonally.

A car door protector is described in U.S. Pat. No. 3,147,176 for "Magnetic Car Door Protector." The protector of the '176 patent is shallow and held in place by a large number of magnets. While such a protector provides some protection for a car door, the shallow design is only suitable for longitudinal placement and does not provide a vertical standoff sufficient if spaced apart for use on a cars roof (i.e., will not carry cargo high enough to clear a convex car roof profile), and the large number of magnets in the device of the '176, while required for the intended use on a car door, make the device difficult to position on a car roof or remove from a car roof.

What is needed is a motor vehicle roof protection system including standoffs providing sufficient height to carry cargo above the roof, and not requiring so many magnets that the standoffs are difficult to position or remove.

BRIEF SUMMARY OF THE INVENTION

The present invention addresses the above and other needs by providing a motor vehicle roof protection system includes a pair of magnetically attachable elongated roof standoffs to carry cargo above a car (or any motor vehicle) roof. One elongated roof standoff may be positioned near a forward end of the car roof and another elongated roof standoff may be positioned near a rearward end of the car roof. Magnets are embodied within the elongated roof standoffs to resist movement on the roof surface, with a layer of material under the magnets to protect the roof finish. The elongated roof standoffs have sloped tops, and the roof standoffs are positioned with the slopes facing forward to produce a downward force on the roof standoffs, and thereby secure the roof standoffs with fewer magnets than otherwise required. Preferably, the tops include a textured portion for contact with cargo. The cargo may be held against the elongated roof standoffs using straps, ropes, or any suitable fastener.

In accordance with one aspect of the present invention, there is provided a method for protecting a motor vehicle roof. The method includes the steps of positioning two elongated roof standoffs on the motor vehicle roof, placing cargo on the roof standoffs, and securing the cargo to the motor vehicle roof. Each elongated roof standoff comprises a roof standoff body and at least two spaced apart magnets embedded in the body. The roof standoffs are laterally aligned and longitudinally spaced apart on the roof, and positioning the two roof standoffs with sloping top surface sloping towards the front of the car.

In accordance with another aspect of the present invention, there is provided a motor vehicle roof protector system including at least one elongated roof standoff comprising a roof standoff body, a forward sloping top of the roof standoff body, and at least two spaced apart magnets embedded in the roof standoff body.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 2A is a detailed front view of a roof standoff of the roof protection system.

FIG. 2B is a detailed top view of the roof standoff of the roof protection system.

FIG. 2C is a detailed end view of the roof standoff of the roof protection system.

FIG. 2D is a cross-sectional view of the roof standoff taken along line 2D-2D of FIG. 2A.

FIG. 2E is a cross-sectional view of the roof standoff taken along line 2E-2E of FIG. 2C.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1B:
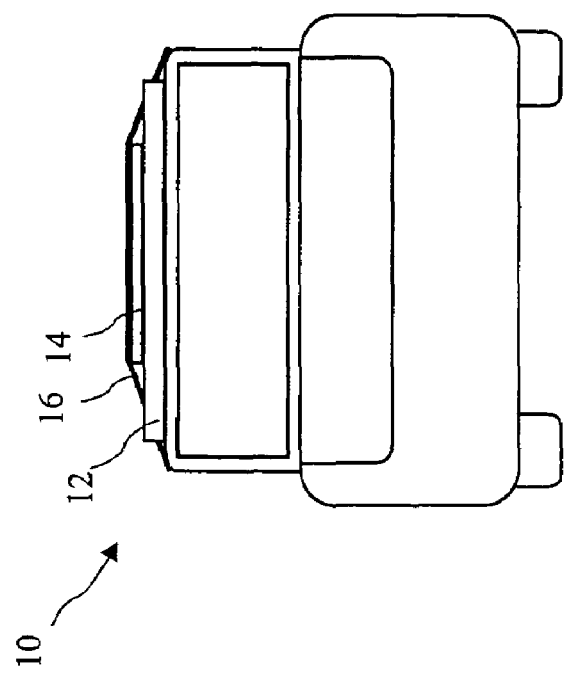
FIG. 1B is a rear view of the motor vehicle carrying cargo on the roof protection system.
Figure 1A:
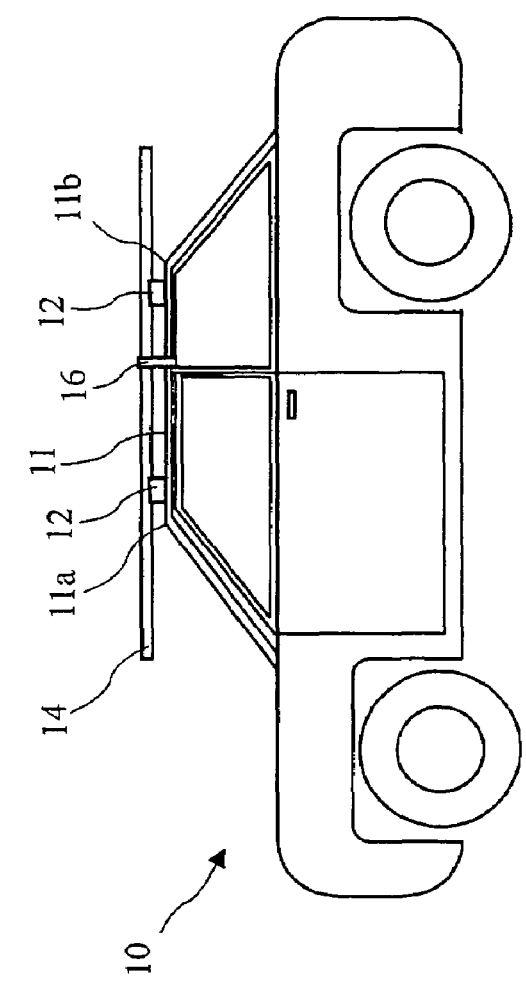
FIG. 1A is a side view of a motor vehicle carrying cargo on a roof protection system according to the present invention.

A side view of a motor vehicle 10 carry cargo 14 on roof standoffs 12 of a roof protection system is shown in FIG. 1A. The roof standoffs 12 (or lateral roof standoffs) rest on the roof 11 of the motor vehicle 10. The roof standoffs 12 hold the cargo 14 high enough to clear a high point of an arced roof, or to allow protruding features (e.g., ski or snow board bindings)

to clear the roof 11. A strap 16, cord, rope, or the like is used to secure the cargo 14 to the motor vehicle 10, and the strap 16 is preferably independent of the roof standoffs 12. The strap 16 might, for example, be looped though open windows, or hooked into edges of the roof or to window gutters.

A rear view of the motor vehicle 10 carrying cargo 14 on the roof standoffs 12 is shown in FIG. 1B. The roof standoffs 12 are laterally mounted on the roof 11, and are longitudinally spaced apart, preferably far enough to provide stable support to the cargo 14, and more preferably longitudinally spaced apart at least half the length of the roof 11. One of the two roof standoff 12 generally resides near a forward edge 11a of the roof 11, and another of the two roof standoff 12 generally resides near a rearward edge 11b of the roof 11.

A detailed front view of the roof standoff 12 of the roof protection system is shown in FIG. 2A, a detailed top view of the roof standoff 12 is shown in FIG. 2B, and a detailed end view of the roof standoff 12 is shown in FIG. 2C. The roof standoff 12 has roof standoff body 13 with an approximately vertical forward face 27, an approximately vertical rear face 29, a sloped top 26 and a concave base 22. The roof standoff body 13 is preferably made from medium density polyurethane foam or a similar material. The sloped top 26 has a smaller height H1 at a rounded forward edge 28a, and a greater height H2 at a rounded rearward edge 28b. The height H1 is preferable approximately 1.25 inches, and the height H2 is preferably approximately two inches. The concave base 22 allows a better fit to typical motor vehicle roofs, and is preferably vertically recessed R approximately 0.38 inches at the center of the base 22 The sloped top 26 is preferably positioned on the roof 11 with the slope forward, thereby providing some downward force on the roof standoff 12 from wind passing over the roof 11. This additional downward force adds to the attraction of magnets 18 to the roof 11, thereby allowing fewer magnets 18 to be embedded in the roof standoff 12, thereby allowing easier positioning and removal of the roof standoff 12.

A textured area 20 resides on the rearward edge 28b of the sloped top 26 and preferably covers an arced portion having a radius of approximately 0.5 inches. The textures area 20 is preferably embossed on the surface of the roof standoff body 13, but may be a separate piece attached to the roof standoff body 13. The sloping top 26 has a downward forward attitude as seen in FIG. 2C when the roof standoff base 22 is residing on the vehicle roof 11. The sloping top 26 provides downward force on the roof standoff 12 when the motor vehicle 10 is moving forward due to air cooperating with the sloping top 26.

The roof standoff 12 is made to reside laterally on the roof 11 and is preferably slightly narrower than the roof 11. The roof standoff 12 has a length Ls of preferably between 24 inches and 36 inches, and more preferably approximately 32 inches, a width Ws which is preferable between three and four inches, and more preferably approximately 3.5 inches, and a height Hs which is preferably between one and four inches, and more preferably approximately two inches. The roof standoff 12 thus preferably has a horizontal area between 72 and 144 square inches and more preferably has a horizontal area of approximately 112 square inches.

A cross-sectional view of the roof standoff 12 taken along line 2D-2D of FIG. 2A is shown in FIG. 2D. At least two magnets 18 are embedding in the roof standoff 12, and more preferably at least four magnets, and most preferably, four magnets. The magnets 18 are spaced apart, and preferably evenly spaced apart, more preferably spaced at least four inches apart, and most preferably spaced at least six inches apart. The magnets 18 preferably have a length Lm of between 1.5 and two inches, and more preferably approximately 1⅞ inches, and a width Wm of between one and two inches, and more preferably approximately 1.5 inches. The magnets 18 thus have a preferred total horizontal area of between six and sixteen square inches and a more preferred horizontal area of approximately 11¼ square inches. Therefore, the preferred ratio of the horizontal area of the magnets 18 to the horizontal area of the roof standoff 12 is between 6/144 and 16/72 and more preferably the ratio of the horizontal areas is approximately ⅒. The limited attraction of the magnets combines with the aerodynamic downforce provided by the sloped top to retain the roof standoffs 12 on the vehicle roof.

A cross-sectional view of the roof standoff taken along line 2E-2E of FIG. 2C is shown in FIG. 2E. The magnets 18 preferably have a thickness Tm of between ¼ and ½ inches, and more preferably approximately ⅜ inches. The magnets 18 are preferably embedded a height Hm above the concave base 22 of the roof standoffs 12, preferably approximately ¼ inches. Other similar devices, for example as described in U.S. Pat. No. 3,147,176 for "Magnetic Car Door Protector," include a nearly continuous array of magnets which would make both adjustment and removal of the roof standoff difficult.

Figure 3:
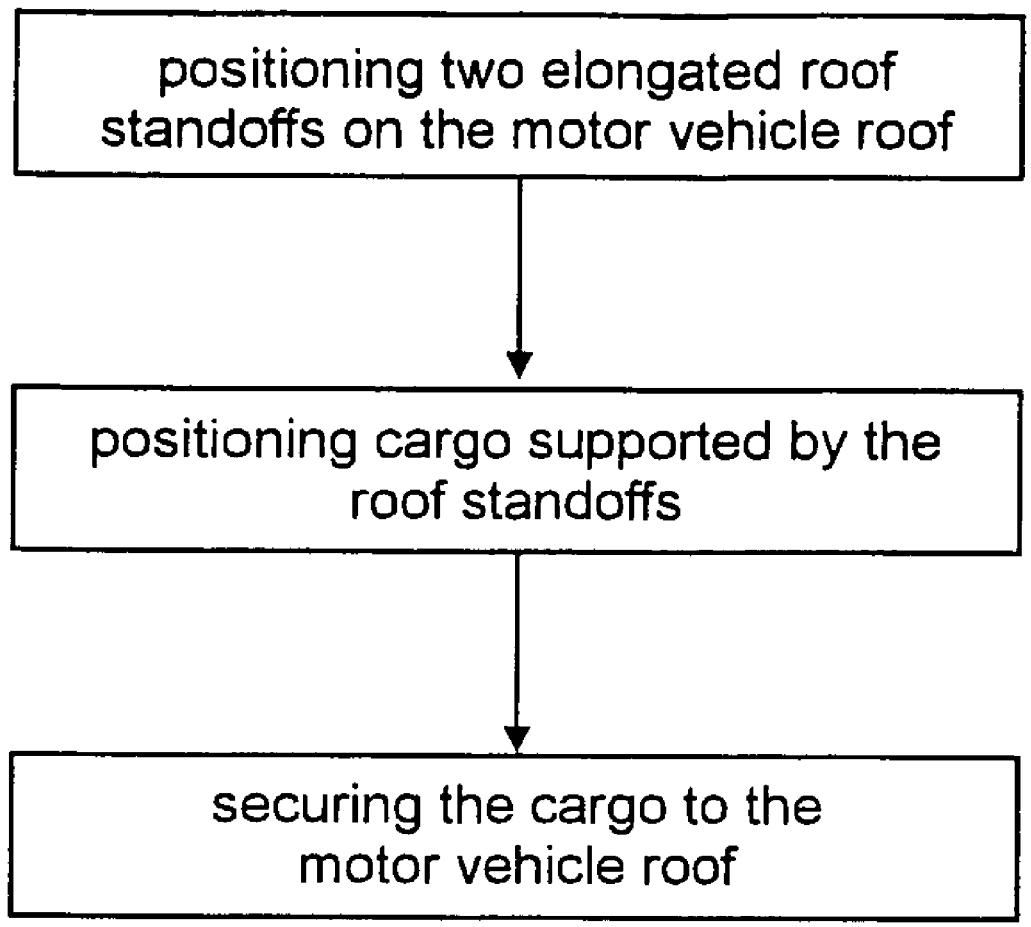
FIG. 3 is a method for protecting a motor vehicle roof when carrying cargo thereon.

A method for protecting a motor vehicle roof when carrying cargo thereon is described in FIG. 3. The method includes the steps of positioning two elongated roof standoffs on the motor vehicle roof, positioning cargo supported by the roof standoffs, and securing the cargo to the motor vehicle roof. The roof standoffs are preferably laterally aligned (i.e., run across the roof from one side to the opposite side) and longitudinally spaced apart on the roof, and with sloping top surface sloping towards the front of the car. The cargo may be secured with a strap, which strap is preferably independent of the roof standoffs and, for example, routed through open windows, or hooked to edges of the roof or window gutters.

While the invention herein disclosed has been described by means of specific embodiments and applications thereof, numerous modifications and variations could be made thereto by those skilled in the art without departing from the scope of the invention set forth in the claims.

I claim:

1. A method for protecting a motor vehicle roof, the method comprising:

positioning two long and narrow roof standoffs, having two opposite parallel long and straight sides and two opposite short ends, the ends connecting the sides, forming a rectangular footprint on the motor vehicle roof with the sides residing across the motor vehicle roof and with a first one of the roof standoffs residing on a front portion of the motor vehicle roof and a second one of the roof standoffs residing on a rear portion of the motor vehicle roof spaced apart from the first one of the roof standoffs to provide support for cargo carried on the roof standoffs with bases of the roof standoffs residing against the motor vehicle roof and downward sloping top surfaces of the roof standoffs residing opposite the motor vehicle roof, wherein one of the sides and a lowest front edge of the downward sloping top surface of each roof standoff resides towards the front of the motor vehicle roof and the opposite sides and a highest rear edge of the downward sloping top surface of each roof standoff resides towards the rear of the motor vehicle roof and the sloping top surface slopes continuously downward from the higher rear edge to the lower front edge and has neither inwardly nor outwardly protruding features, and wherein each elongated roof standoff comprises a roof standoff body and at least two spaced apart magnets embedded in the body near the base to provide magnetic attraction between the roof standoffs and the roof and additional downward force provided by the downward sloping top surfaces add to the attraction of magnets to the roof, thereby allowing fewer magnets to be embedded in the roof standoff, thereby allowing easier positioning and removal of the roof standoff;

positioning the cargo supported by the roof standoffs; and securing the cargo to the motor vehicle roof.

2. The method of claim 1, wherein positioning the cargo supported by the roof standoffs comprises resting the cargo on the roof standoffs while not attaching the cargo to the roof standoffs.

3. The method of claim 1, wherein positioning the two roof standoffs on the motor vehicle roof comprises positioning the two roof standoffs with lengthwise concave bases tapering from one of the ends to a center of each roof standoff and from the center to the opposite end of the roof standoff, concave in a direction parallel with the long sides, against the roof, the concave bases for allowing a better fit to typical motor vehicle roofs and providing a flatter cargo bearing top surface.

4. The method of claim 1, wherein securing the cargo to the motor vehicle roof comprises securing the cargo using a strap which is not attached to the roof standoffs.

5. The method of claim 1, further including securing the roof standoffs to the motor vehicle roof through a combination of an attraction of at least four spaced apart magnets embedded in the roof standoff body and air pushing down on the sloping top of the roof standoff while the vehicle is moving, wherein the no more than four spaced apart magnets provide a minimum necessary attraction to the roof to allow easy positioning of the roof standoffs and reduce the chance of scratching the roof, wherein the roof standoffs are at least 24 inches long.

6. The method of claim 5, wherein securing the roof standoffs to the motor vehicle roof through the attraction of four spaced apart magnets embedded in the roof standoff body comprises securing the roof standoffs to the motor vehicle roof through the attraction of four spaced at least four inches apart magnets having a thickness between ¼ and ½ inches and embedded in the roof standoff body to provide a minimum necessary attraction to the roof to allow easy positioning of the roof standoffs and reduce the chance of scratching the roof.

7. The method of claim 5, wherein securing the roof standoffs to the motor vehicle roof through the attraction of four spaced apart magnets embedded in the roof standoff body comprises securing the roof standoffs to the motor vehicle roof through the attraction of four spaced at least six inches apart magnets having a thickness between ¼ and ½ inches and embedded in the roof standoff body to provide a minimum necessary attraction to the roof to allow easy positioning of the roof standoffs and reduce the chance of scratching the roof.

8. A motor vehicle roof protector system comprising:

at least one elongated roof standoff comprising:

a long and narrow roof standoff body having opposite front and rear parallel long straight sides spanning the length of the roof standoff body and short ends connecting the parallel long straight sides, each of the long straight sides having a straight length of between 24 inches and 36 inches;

a roof standoff base of the roof standoff body for residing against the motor vehicle roof;

a forward face of the front parallel long straight side of the roof standoff body extending up from the roof standoff base and having a smaller height H1;

a rearward face of the rear parallel long straight side of the roof standoff body opposite the forward face and extending up from the roof standoff base and having a greater height H2 greater than the height H1;

a sloping top of the roof standoff body opposite the roof standoff base having neither inwardly nor outwardly protruding attachment features and sloping continuously downward between a rearward edge to a forward edge, the rearward edge meeting the rearward face and the forward edge meeting the forward face and connecting the forward face to the rearward face and having a downward forward attitude when the roof standoff base is residing on the vehicle roof, the sloping top for providing downward force on the roof standoff when the motor vehicle is moving forward due to air cooperating with the sloping top; and at least two spaced apart magnets embedded in the roof standoff body proximal to the roof standoff base, the magnets are selected so that the additional downward force provided by the downward sloping top surfaces add to the attraction of magnets to the roof, thereby allowing fewer magnets to be embedded in the roof standoff, thereby allowing easier positioning and removal of the roof standoff.

9. The motor vehicle roof protector system of claim 8, wherein at least two spaced apart magnets comprise at least four magnets spaced at least four inches apart, the magnets are between ¼ and ½ inches thick.

10. The motor vehicle roof protector system of claim 9, wherein at least four magnets spaced at least four inches apart comprise four magnets in a row spaced at least six inches apart.

11. The motor vehicle roof protector system of claim 9, wherein the at least two spaced apart magnets are embedded approximately ¼ inches from a base of the roof standoff body.

12. The motor vehicle roof protector system of claim 8, wherein the roof standoff body is between one and four inches high.

13. The motor vehicle roof protector system of claim 12, wherein the roof standoff body is approximately two inches high.

14. The motor vehicle roof protector system of claim 12, wherein the height H1 is approximately 1.25 inches and the height H2 is approximately two inches.

15. The motor vehicle roof protector system of claim 9, wherein the roof standoff body is approximately 32 inches long.

16. The motor vehicle roof protector system of claim 8, wherein the roof standoff is between three and four inches wide.

17. The motor vehicle roof protector system of claim 16, wherein the roof standoff is approximately three and one half inches wide.

18. A motor vehicle roof protector system comprising:

two long and narrow roof standoffs having opposite front and rear parallel long sides spanning the length of the roof standoff and opposite short ends, the ends connecting the long sides, the front long sides between 24 and 36 inches long and the rear long sides between 24 and 36 inches long, each comprising:

a roof standoff body approximately:

between one and four inches high; and between three and four inches wide;

a roof standoff base of the roof standoff body residing against the motor vehicle roof;

a sloping top of the roof standoff body opposite the roof standoff base having neither inwardly nor outwardly protruding features, the sloping top having a forward edge with a first height H1 above the motor vehicle roof and a rearward edge with a second height H2 above the motor vehicle roof, wherein the height H2 is greater than the height H1 resulting in a continuous downward forward slope of the sloping top, the sloping top for providing aerodynamic down force to help hold the roof standoffs in place while the vehicle is moving; and four spaced at least six inches apart magnets embedded in the roof standoff body near the roof standoff base and residing parallel to the roof standoff base having a magnet thickness $T_m$ less than both a magnet width $W_m$ and a magnet length $L_m$, wherein the roof standoff is mountable with the forward edge forward facing a front edge of the vehicle roof and the combination of air pushing down on the sloping top and the magnets holds the roof standoff in place while the vehicle is moving.

19. The motor vehicle roof protector system of claim 18, wherein the base comprises a concave base, the concave base having a peak halfway between the short opposite ends and tapering from the peak down to the short opposite ends, the convex base for allowing a better fit to typical motor vehicle roofs.

20. The motor vehicle roof protector system of claim 18, wherein each of the magnets has a length Lm of between 1.5 and two inches, and a width Wm of between one and two inches, and a thickness between ¼ and ½ inches.

* * * * *